US005739514A

United States Patent [19]

Uchida

[11] Patent Number: 5,739,514

[45] Date of Patent: Apr. 14, 1998

[54] SENSOR AND SECURITY TAG USING THE SAME

[75] Inventor: Kenichi Uchida, Kawasaki-ken, Japan

[73] Assignee: Fala System Co., Ltd., Japan

[21] Appl. No.: 717,128

[22] Filed: Sep. 20, 1996

[30] Foreign Application Priority Data

Sep. 22, 1995 [JP] Japan .................................... 7-268050
Jul. 10, 1996 [JP] Japan .................................... 8-198525

[51] Int. Cl.$^6$ ........................................ G06K 7/00

[52] U.S. Cl. .......................... 235/435; 235/375; 235/487; 235/382

[58] Field of Search .................................... 235/375, 435, 235/487, 382

[56] References Cited

U.S. PATENT DOCUMENTS 5,444,223 8/1995 Blama .................................... 235/435

*Primary Examiner*—Harold Pitts
*Attorney, Agent, or Firm*—Goodman & Teitalbaum, Esqs.

[57] ABSTRACT

A sensor capable of reliably detecting a pulse voltage generated by a magnetic material by means of electromagnetic induction and a security tag using the sensor, which produces an alarming sound and causes a security gate to produce another alarming signal to thereby specify a product brought out illegally while preventing an erroneous operation of the security tag in usually handling a product, are provided. A pulse generating member of magnetic material which is inserted into a hollow tube in a free movement state generates a pulse voltage in an A.C. magnetic field. The pulse voltage is derived by a pick-up coil wound on the hollow tube as a sensor output. The pulse voltage thus derived activates an operation control circuit to actuate an alarm device and an alarm device of the security gate is operated by the pulse voltage or its high harmonics or a pulse control signal generated by the operation control circuit or its high harmonics.

14 Claims, 4 Drawing Sheets

SENSOR AND SECURITY TAG USING THE SAME

BACKGROUND OF THE INVENTION

1. Field of the Invention

The present invention relates to a security tag to be attached to a commercial product for alarming clerks when the product is about to be stolen and, particularly, to a security tag which actuates an alarm connected to the security gate when it passes through the security gate and simultaneously actuates an alarm housed in the tag.

2. Description of the Related Art

As means for preventing a commercial product arranged in a shop from being brought our illegally, there have been a self-alarming type security device which is attached to the product and houses an alarming means which generates alarming sound when the product is brought out and a gate type security device which is attached to the commercial product and, when the product with the security device which is not properly processed passes through a gate installed in the vicinity of a door of the shop, notifies clerks the fact by alarming sound or light.

The self-alarming security device includes a switch which is turned on, when it is detached from the commercial product, to actuate the alarm housed therein to thereby alarm the illegal bring-out of the product by sound. It is, thereof, possible to easily specify the product which is about to be stolen. However, there may be a case where the self-alarming security device is detached from a product when a purchaser holds it to see and the switch is erroneously turned on, giving uncomfortableness to the purchaser.

On the other hand, there is no erroneous operation of the gate type security device such as occurred in the self-alarming security device since the alarm device connected to the gate is actuated when a product is brought out illegally through the gate. However, it is difficult to specify a person who is attempting an illegal bring-out of the product in question, particularly, when a plurality of persons pass through the gate substantially simultaneously.

In order to solve the problems inherent to these prior art security devices, a security system including a security device to be attached to a commercial product and a security gate is proposed in, for example, Japanese Utility Model Application Laid-open No. S63-195494. The security device houses an alarm therein which is actuated when the security device is separated from the commercial product and/or when is detects a signal from the security gate. The security gate is provided with another alarm which is actuated simultaneously with the actuation of the alarm of the security device.

In the proposed security system, an information of detachment of the security device from the product and the signal from the security gate are transmitted through radio frequency wave. Therefore, the system tends to be operated erroneously by external radio waves from such as portable telephone set which is becoming popular recently, illegal radio waves, cross-modulated and/or interacted wave of various radio waves.

Setting the above mentioned security system aside, an electro-magnetic security gate which magnetically detects an illegal bring-out of a commercial product has been practiced, in which a security tag in the form of a label having an adhesive surface on which an amorphous magnetic wire as thin as in the order of 100 microns is used. The security tag is adhered to a commercial product. When the commercial product having the security tag adhered thereto passes through a security gate having an A.C. magnetic field, a pulse voltage is generated in the amorphous magnetic wire of the security tag. The security gate detects the pulse voltage or a high harmonic wave thereof to alarm.

In the latter security tag in which the amorphous magnetic wire is fixed between the surface of the product and the label, an attitude of the wire with respect to the magnetic field of the security gate is fixed and not always optimum for generating the pulse voltage having enough magnitude. Therefore, there is a problem that the pulse voltage generated in the amorphous magnetic wire can not be detected by a detector provided in the security gate in some case.

SUMMARY OF THE INVENTION

An object of the present invention is to provide a security tag to be attached to a commercial product, which can specify the commercial product when the latter is illegally brought out, can prevent an erroneous operation from occurring during a usual handling of the product and can substantially remove the possibility of unusual operation thereof during a security working.

Another object of the present invention is to provide a sensor including a pulse voltage generating member which is supported independently from any other members such that it can reliably generate a pulse voltage in an A.C. magnetic field and can reliably detect the pulse voltage thus generated. The state of the pulse voltage generating member supported independently from others will be referred to as "free movement state" hereinafter.

According to the present invention, the security tag for producing sound by detecting a pulse voltage generated in an A.C. magnetic field generated by an electro-magnetic security gate and for actuating an alarm of the security gate by the pulse voltage or high harmonic thereof comprises a power source for supplying electric power, a sensor for generating a pulse voltage in the electro-magnetic security gate, an operation control circuit responsive to the pulse voltage generated by the sensor for generating a pulse control circuit and an alarm responsive to the pulse control signal generated by the operation control circuit to produce an alarm sound.

The sensor is constructed with a hollow tube of non-magnetic material, a pulse voltage generating member of amorphous magnetic material or permalloy, the pulse voltage generating member of the magnetic material being inserted into the hollow tube in the free movement state therein, and a pick-up coil wound on an outer peripheral surface of the hollow tube for picking up the pulse voltage generated by the pulse voltage generating member.

When the security tag passes through the electro-magnetic security gate, the pulse voltage generating member of the sensor generates a pulse voltage by the A.C. magnetic field of the electro-magnetic security gate. The pulse voltage picked-up by the pick-up coil is supplied to the operation control circuit. The operation control circuit responds to the pulse voltage to actuate the alarm to thereby produce the alarming sound and notify that the commercial product is not be brought out. Simultaneously therewith, the pulse voltage or its high harmonic actuates the alarm device of the security gate to cause the alarm device to alarm that the product is being brought out.

In order to actuate the alarm device of the security gate more reliably, the security tag according to the present invention may be further provided with a ribbon of permalloy or amorphous magnetic material. Such magnetic ribbon makes the detection of pulse voltage in the security gate more reliable since such ribbon can generate a larger pulse voltage compared with the pulse voltage generated by the magnetic wire of permalloy or amorphous magnetic material.

The operation control circuit of the security tag according to the present invention may be constructed with a switch circuit responsive to the pulse voltage generated by the pulse voltage generating member of the sensor for connecting the operation control circuit to the power source, an operation circuit for actuating the alarm and a control circuit for actuating the operation circuit such that the alarm operates intermittently with a predetermined time period. The intermittent operation of the alarm gives more attention to clerks. By setting the predetermined time period of the intermittent operation of the alarm differently for every product, it is possible to discriminate the product in question from others.

In the security tag according to the present invention, the alarm comprises a piezo-electric buzzer, the switch circuit comprises a thyristor or switching transistor having a gate or base terminal connected to one end of the pick-up coil, the operation circuit comprises a pulse generator for actuating the alarm and the control circuit comprises a control pulse generator circuit connected to operate the piezo-electric buzzer intermittently through the pulse generator.

The thyristor or the switching transistor functions to restrict power consumption of the security tag during the tag is in a non-operation state or in a standby state. The piezo-electric buzzer also restricts power consumption during its operation. On the other hand, the alarm device of the security gate operates when one of the pulse voltage of the sensor or a high harmonic thereof and the pulse control signal of the pulse generator circuit or its high harmonic is detected. Alternatively, the alarm device may be constructed such that it operates only when the both signals are detected simultaneously.

Further, the operation control circuit of the security tag according to the present invention may further provided with a switch for connecting the power source to the security tag when the security tag is detached from the product, to actuate the alarm of the security tag as in the conventional self-alarming security device.

On the other hand, the sensor according to the present invention comprises the hollow tube of non-magnetic material, the pulse voltage generating member of magnetic material, inserted into the hollow tube in the free movement state therein, and the pick-up coil wound on the outer peripheral surface of the hollow tube.

When the sensor is in the A.C. magnetic field, it generates a pulse voltage every time when the polarity of the magnetic field is changed. The magnitude of the pulse voltage thus generated is larger since the pulse voltage generating member thereof is supported in the free movement state. The pulse voltage is detected by the pick-up coil.

The pulse voltage generating member of the sensor according to the present invention may comprises a magnetic wire or strip. The magnetic wire or strip generates a pulse voltage reliably when it is put in the A.C. magnetic field, so that it is possible to actuate the alarm device of the security gate and the alarm of the security tag reliably when the product is brought out illegally.

Further, in the sense of the present invention, the pulse voltage generating member in the hollow tube may be made longer than the hollow tube. In such case, it is possible to easily confirm whether or not the pulse voltage generating member is within the hollow tube when the sensor is mounted on a predetermined position.

BRIEF DESCRIPTION OF THE DRAWINGS

These and other objects, features and advantages of the present invention will be more clearly understood from the following specification and drawings all of which disclose non-limiting embodiments of the present invention. In the drawings.

DETAILED DESCRIPTION OF THE PREFERRED EMBODIMENTS

Figure 1:
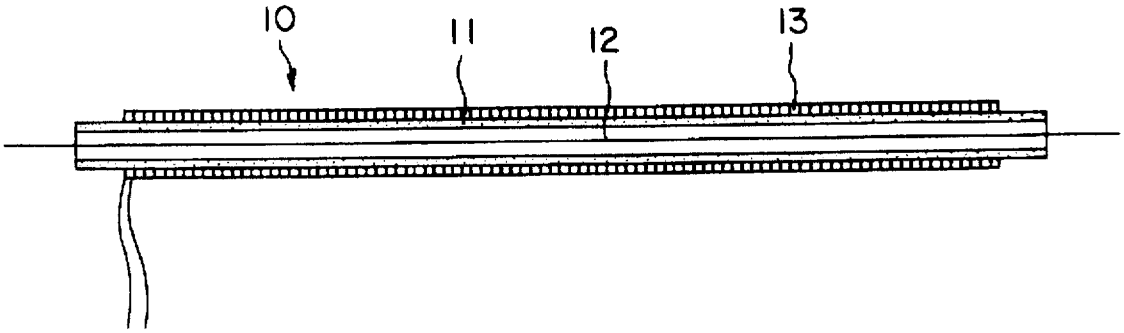
FIG. 1 is a cross section of a sensor according to an embodiment of the present invention.

FIG. 1 is a cross section of a sensor according to an embodiment of the present invention. As shown in FIG. 1, a sensor 10 according to an embodiment of the present invention is constructed with a hollow tube 11 of non-magnetic material, a pulse voltage generating member 12 in the form of a wire of magnetic material inserted into the hollow tube 11 and a pick-up coil 13 wound on an outer peripheral surface of the hollow tube 11.

Size and outer configuration of the hollow tube 11 may be arbitrarily selected so long as the pick-up coil 13 can be wound on the outer peripheral surface, a pulse voltage generated by the pulse voltage generating member 12 can be picked up by the pick-up coil 13 and the pulse voltage generating member 12 can be supported in the free movement state in the hollow tube 11. In order to effectively generate the pulse voltage by the pulse voltage generating member, to effectively pick up the voltage and to facilitate an assembling work thereof, the hollow tube 11 has preferably a circular cross section having a diameter in the range from 1.0 to 1.2 mm and has preferably a length in the range from 6 to 10 cm.

Diameter of the magnetic wire as the pulse voltage generating member 12 is in a range from 60 to 140 microns, preferably, from 85 to 110 microns. The pulse voltage generating member 12 is so thin that it is very difficult to visibly check whether or not it is put in the hollow tube 11 freely movably even if the hollow tube 11 is made of a transparent non-magnetic material. Therefore, if the pulse voltage generating member 12 correctly inserted into the hollow tube 11 is unintendedly dropped during an assembling process of the sensor having the hollow tube 11 to the security tag, there may be a case that the sensor without the pulse voltage generating member is erroneously assembled to the security tag.

In the present invention, in order to prevent such defective sensor from being assembled to the security tag, the magnetic wire as the pulse voltage generating member 12 is made longer than the hollow tube 11 so that the magnetic wire protrudes visibly from at least one end of the hollow tube 11 by a certain length. The length of the magnetic wire protruded from the end of the hollow tube 11 is arbitrary. However, in order to make confirmation of the existence of magnetic wire in the hollow tube 11 easy without degradation of workability, the length of the magnetic wire protruded from the hollow tube is preferably in a range from 0.5 to 1.5 cm.

Diameter of an electrically conductive wire forming the pick-up coil 13 and number of turns thereof are selected such that the sensor can output a pulse voltage having a magnitude required in an electric circuit design of the security tag. As an example, the pick-up coil 13 is formed by winding a conductive wire having diameter of 50 microns by 12000–18000 turns on the hollow tube 11 having the above mentioned shape and size and provided with the amorphous or permalloy magnetic wire as the pulse voltage generating member 12.

When the sensor 10 constructed as mentioned above is put in an A.C. magnetic field, the pulse voltage generating member 12 in the form of magnetic wire generates pulse voltages which are derived through the pick-up coil 13. It has been found that, in the case where the sensor 10 is constructed with the components having the above mentioned sizes and values, a minimum value of an output pulse voltage generated across the pick-up coil 13 is about 0.8V which is enough to actuate an electric circuit of the security tag, which is to be described below.

Figure 2:
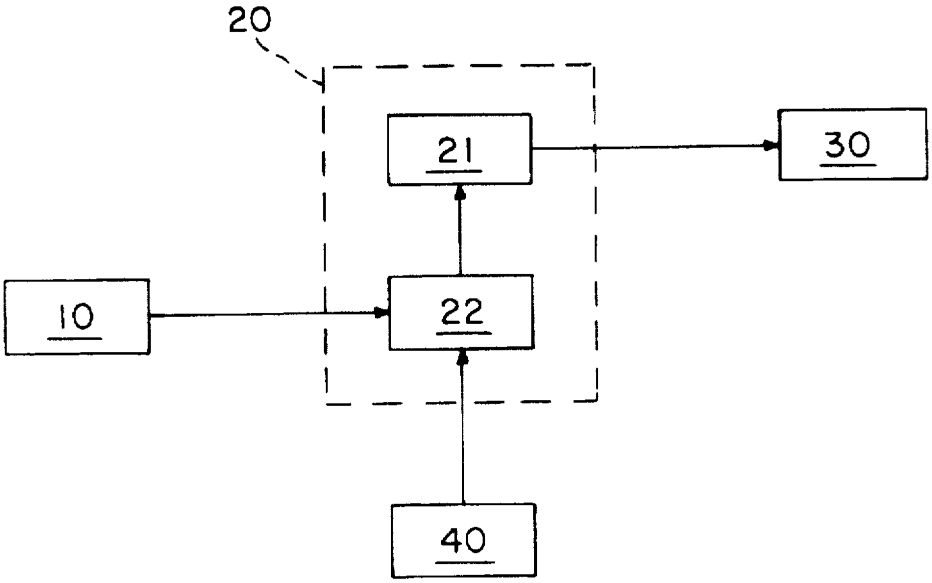
FIG. 2 is a block circuit diagram of a security tag according to another embodiment of the present invention which uses the sensor shown in FIG. 1.
Figure 3:
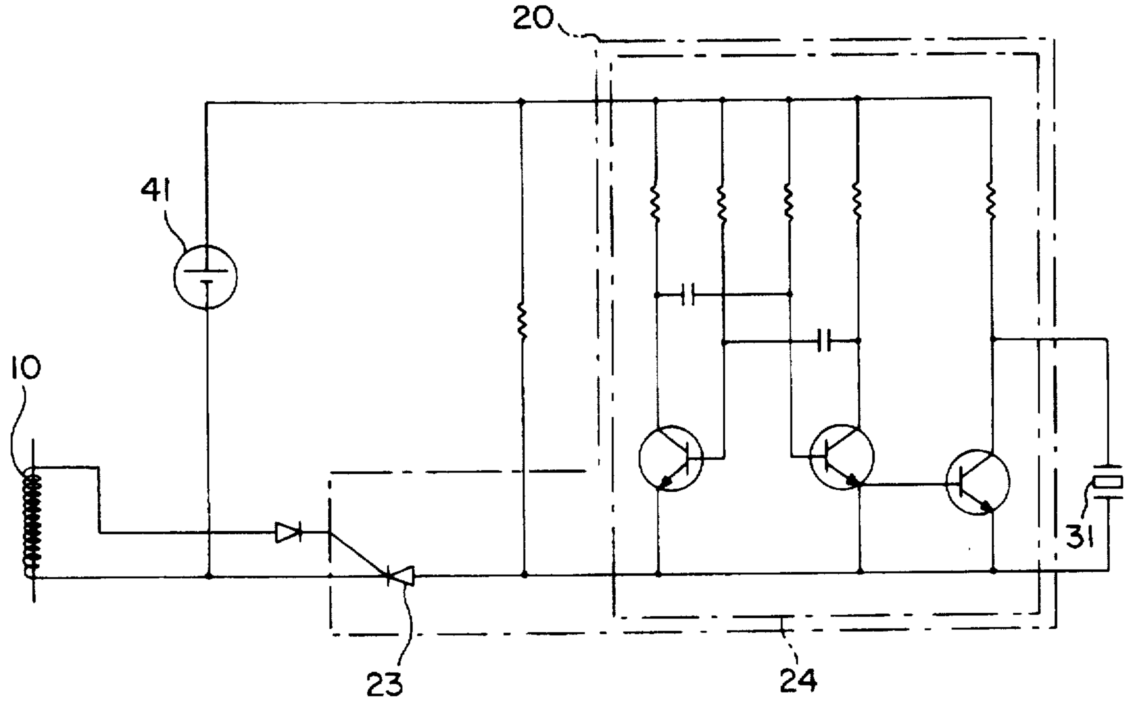
FIG. 3 is a circuit diagram of the security tag shown in FIG. 2.

A block diagram of an embodiment of the security tag according to the present invention is shown in FIG. 2 and the electric circuit thereof is shown in FIG. 3. In FIG. 2, the security tag is composed of the sensor 10, an operation control circuit 20 which is responsive to the pulse voltage generated by the sensor 10 to generate a pulse control signal, an alarm 30 adapted to generate an alarm signal in response to the pulse control signal and a power source 40 for supplying electric power to the operation control circuit 20 and the alarm 30.

As described previously with reference to FIG. 1, when the sensor 10 is put in an A.C. magnetic field, the pulse voltage generating member 12 thereof generates the pulse voltage. Since the construction and operation of the sensor 10 have been described already, details thereof are omitted here for avoidance of duplication.

The alarm 30 may be any so long as it can alarm surrounding people. However, in views of compactness and power economy of the security tag, the alarm 30 is preferably a piezo-electric buzzer 31. The power source 40 may be a battery 41.

The operation control circuit 20 is constructed with a switch circuit 21 for connecting the operation control circuit 20 to the power source 40 in response to the pulse voltage generated by the sensor 10 and an actuation circuit 22 for actuating the alarm 30.

In order to minimize power consumption of the security tag during idling period thereof, the switch circuit 21 may comprise a thyristor or switching transistor having a gate electrode connected to one end of the pick-up coil 13 of the sensor 10. In FIG. 3, the switch circuit 21 comprises a thyristor 23. The actuation circuit 22 may take any circuit construction so long as it can actuate the alarm 30. In the case where the alarm 30 is the piezo-electric buzzer 31, the actuation circuit 22 may be one which can apply a voltage across the piezo-electric buzzer 31 periodically and a sinusoidal wave generator, etc., may be used therefor. In the embodiment shown in FIG. 3, however, a pulse generator 24 utilizing a flip-flop circuit to generate a sound of constant volume is employed as the actuation circuit 22 in order to easily arouse attention.

The security tag of the present constructed as mentioned above is attached to a product in such a way that the tag can not be detached from the product easily. If someone who brings the product with him passes through an electro-magnetic security gate (not show), the security tag attached thereto passes through an A.C. magnetic field of the same gate and the pulse voltage generating member 12 of the sensor 10 generates the pulse voltage which is picked up by the pick-up coil 13 and input to an input of the switch circuit 21, that is, the gate terminal of the thyristor or transistor 23.

The switch circuit 21 is turned on by the pulse voltage to supply electric power from the battery 41 to the actuation circuit 22 which generates the pulse control signal. The pulse control signal is supplied to the piezo-electric buzzer 31 which generate alarming sound. Simultaneously therewith, a sensor (not shown) provided on the security gate responds to the pulse voltage from the sensor 10 or its high harmonics and/or the pulse control signal itself or its high harmonic to generate an alarm signal. Therefore, it is possible to avoid the erroneous operation due to the use of radio frequency as the information transmitting means and to reliably and simply specify the product brought illegally in the conventional gate system.

Figure 4:
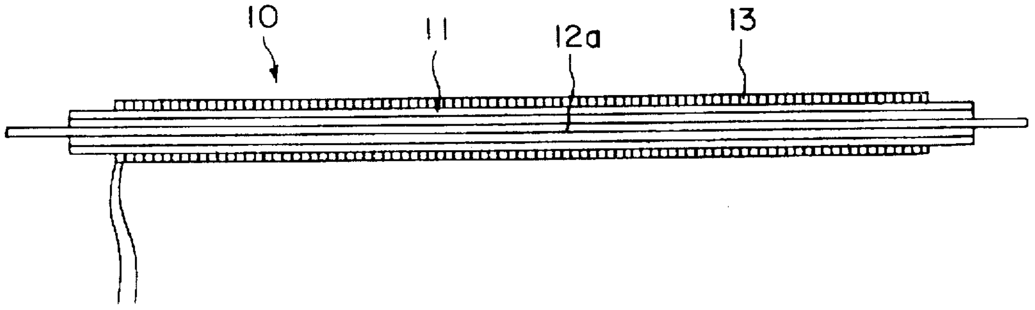
FIG. 4 is a cross section similar to FIG. 1, showing another embodiment of the sensor according to the present invention.

FIG. 4 shows a sensor 10 according to another embodiment of the present invention, which differs from the embodiment shown in FIG. 1 in only that a pulse voltage generating member 12*a* is formed on a different material from that of the pulse voltage generating member 12 in FIG. 1.

The pulse voltage generating member 12*a* takes in the form of a magnetic thin and narrow strip. The magnetic strip is obtained by cutting a film of magnetic material about 25 microns thick to a strip about 100–120 microns wide. The magnetic strip can generate pulse voltage which is substantially the same level as that obtainable by the magnetic wire in an A.C. magnetic field. On the other hand, it is possible to obtain a number of magnetic strips at once by cutting the magnetic film material. Further, since the magnetic film itself is low cost compared with the magnetic wire, the security tag can be manufactured more economically.

Figure 5:
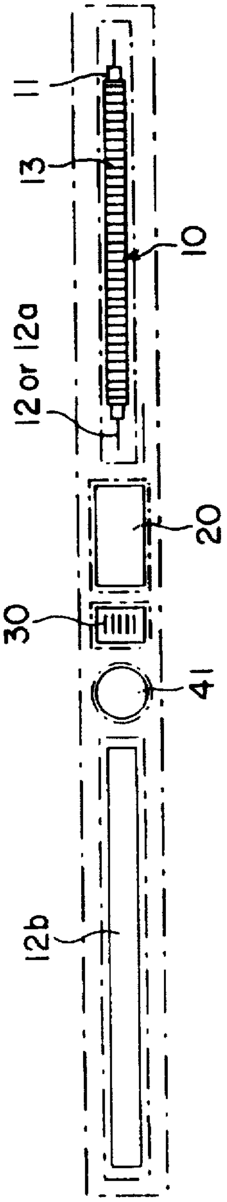
FIG. 5 is a block circuit diagram of a security tag according to another embodiment of the present invention.

FIG. 5 shows a security tag according to another embodiment of the present invention. The security tag in FIG. 5 comprises, in addition to the sensor 10 including the pulse voltage generating member 12 in the form of the magnetic wire or the pulse voltage generating member 12*a* in the form of the strip, a magnetic ribbon 12*b* in the form of a thin strip supported in the free movement state. The magnetic ribbon 12*b* is larger in width than the magnetic strip 12*a* so that it can generate a pulse voltage higher in level than the pulse voltage generated by the magnetic strip 12*a* in the same A.C. magnetic field. The width of the magnetic ribbon 12*b* is not limited specifically. However, in order to generate the pulse voltage having a level high enough, the width of the magnetic ribbon 12*b* is preferably 2–3 mm or more.

Since the alarm device provided on the electro-magnetic security gate receives the high level pulse voltage generated by the magnetic ribbon 12*b* or high harmonic thereof and produces an alarm, it becomes possible to make the security gate wider compared with the case where the pulse voltage generating member 12 or 12*a* is used. Further, since the magnetic ribbon 12*b* is used to generate the signal required to actuate the alarm device of the security gate, it is enough that pulse voltage generating member 12 or 12*a* generates a pulse voltage necessary to turn the operation control circuit 20 on through the pick-up coil 13. Therefore, compactness of the security tag and saving power consumption thereof are achieved by the present invention.

Figure 6:
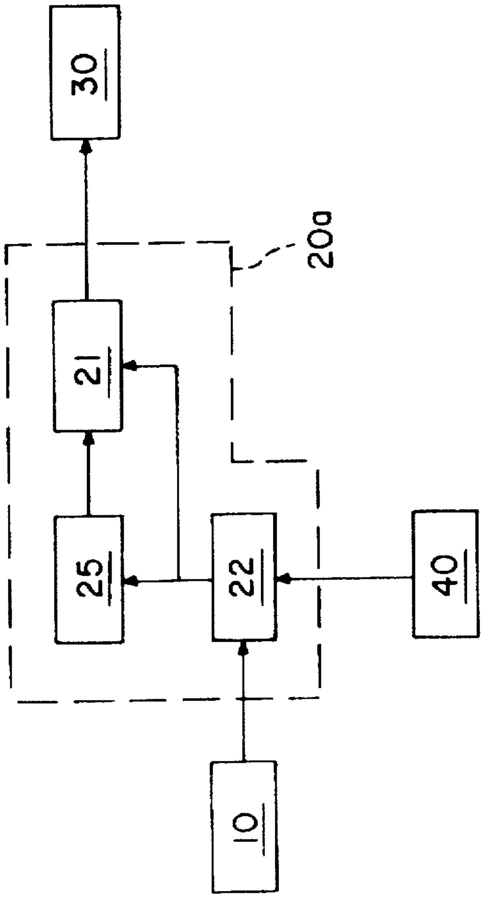
FIG. 6 is a block circuit diagram of a security tag according to a still another embodiment of the present invention.
Figure 7:
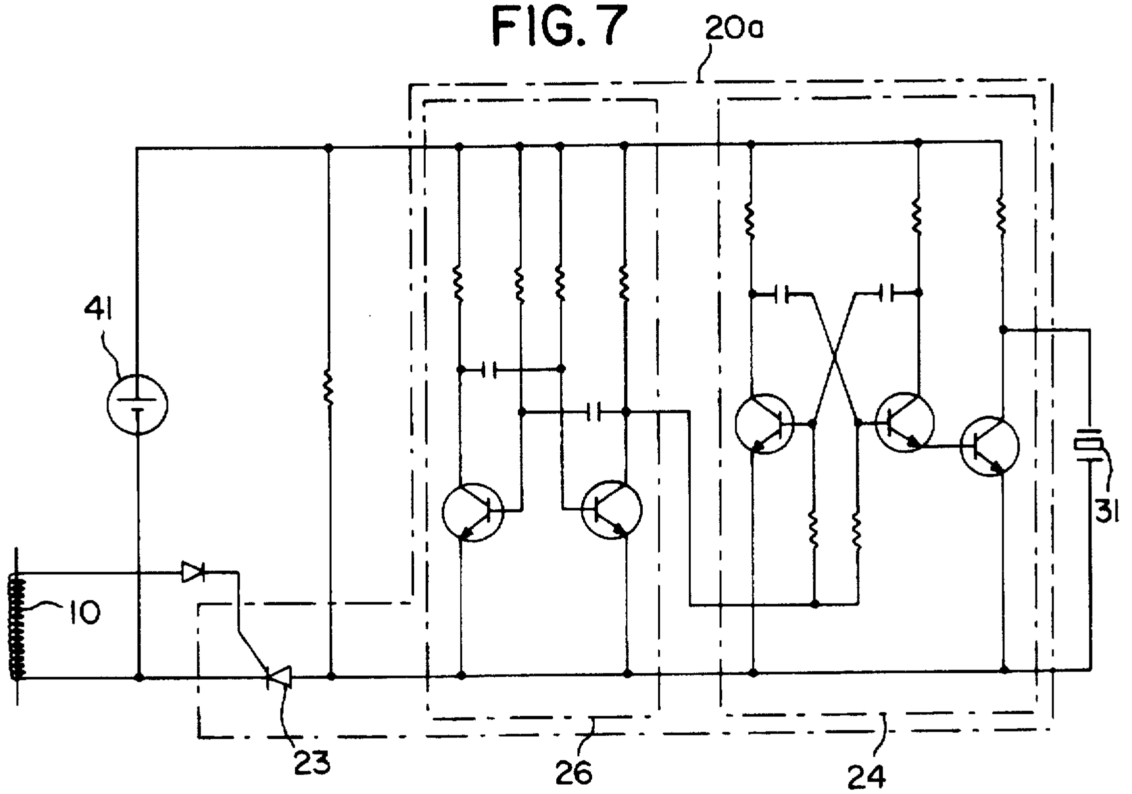
FIG. 7 is a block circuit diagram of a security tag shown in FIG. 4.

FIG. 6 is a block diagram of a security tag according to another embodiment of the present invention and FIG. 7 is an electric circuit diagram of the security tag, which differs from the circuit shown in FIG. 2 in only the construction of the operation control circuit.

That is, in FIG. 7, the operation control circuit 20*a* comprises, in addition to a switch circuit 21 for connecting the operation control circuit 21 to a power source 40 according to a pulse voltage generated by a sensor 10 and an actuation circuit 22 for actuating an alarm device 30 shown in FIG. 2, a control circuit 25 for operating the alarm device 30 intermittently through the actuation circuit 22.

The control circuit 25 may have any construction so long as it can alternately switch the alarm device 30 and/or the actuation circuit 22 between an operating state and a non-operating state. In the example shown in FIG. 7, however, the control circuit 25 is realized by a control pulse generator 26 similar to the pulse generator 24 in FIG. 3 is employed to make alarming sound from the alarm device 30 intermittent clearly such that the alarming sound can arouse attention.

Figure 8:
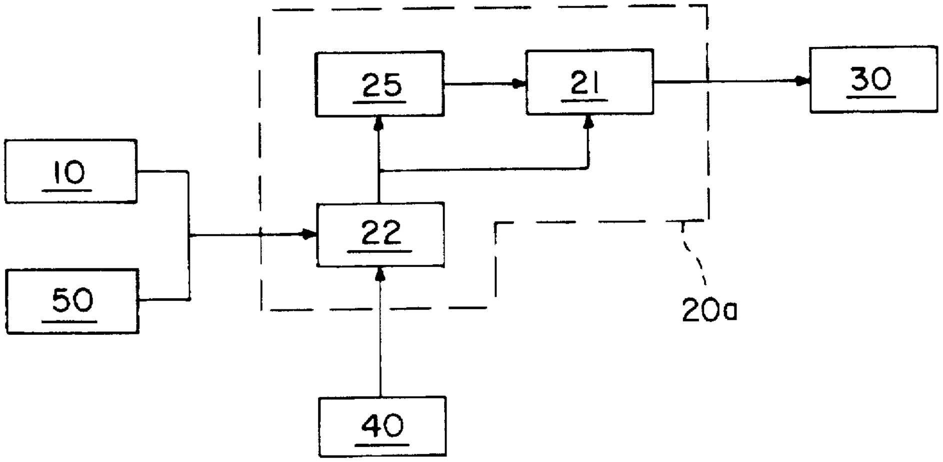
FIG. 8 is a block circuit diagram of a security tag according to a still another embodiment of the present invention.

FIG. 8 is a block diagram of a security tag according to another embodiment of the present invention, which differs from those shown in FIG. 5 to 7 in only that it further includes a switch 50 for connecting the electric circuit to the power source 40 when the security tag is detached from the product.

The switch 50 is connected in parallel to the switch circuit 21 and is made when the security tag is detached from the product to actuate the operation control circuit 20*a* to thereby actuate the alarm device 30.

Therefore, it is possible to produce alarming sound not only when the tag passes through the security gate but also when the tag is detached from the product. However, when the security tag is firmly attached to the product, the value of the product may be lost and, when the security tag is loosely attached to the product to facilitate a detachment of the tag from the product, the tag may be easily detached unintendedly from the product when a purchaser takes it to look at, resulting in an alarming sound. Therefore, the attachment of the security tag to the product must be careful.

Practical construction of the electric circuit in each of the embodiments may be designed in various manner by those skilled in this field so long as the required function thereof is achieved. However, in designing the electric circuit, minimization of power consumption of the security tag during a product on which the security tag is attached is in a showcase should be considered.

What is claimed is:

1. A sensor comprising a hollow tube of non-magnetic material, a pulse voltage generating member of a magnetic material, said pulse voltage generating member being inserted into said hollow tube and supported in said hollow tube in a free movement state, and a pick-up coil wound on an outer peripheral surface of said hollow tube.

2. A sensor as claimed in claim 1, wherein said pulse voltage generating member is a magnetic wire or strip.

3. A security tag for producing sound by detecting a pulse voltage generated by an A.C. magnetic field generated by an electromagnetic security gate and actuating an alarm device provided in said security gate by the pulse voltage or its high harmonics, said security tag comprising:

a power source for supplying electric power;

a sensor for generating a pulse voltage in said electromagnetic security gate, said sensor comprising a hollow tube of non-magnetic material, a pulse voltage generating member of a magnetic material, said pulse voltage generating member being inserted into said hollow tube and supported in said hollow tube in a free movement state, and a pick-up coil wound on an outer peripheral surface of said hollow tube for picking up the pulse voltage generated by said pulse voltage generating member;

an operation control circuit for producing a pulse control signal in response to the pulse voltage generated by said sensor; and an alarm device for producing an alarming signal in response to the pulse control signal produced by said operation control circuit.

4. A security tag as claimed in claim 3, further comprising a magnetic ribbon supported in a free movement state.

5. A security tag as claimed claim 3, wherein said operation control circuit comprises a switch circuit for connecting said operation control circuit to said power source in response to the pulse voltage generated by said sensor, an actuation circuit for actuating said alarm device when said switch circuit connects said operation control circuit to said power source and a control circuit for actuating said actuation circuit such that said alarm device operates with a predetermined time interval.

6. A security tag as claimed in claim 5, wherein said alarm device is a piezo-electric buzzer, said switch circuit is a thyristor or switching transistor having a gate terminal connected to said pick-up coil, said actuation circuit is a pulse generator connected to actuate said alarm device and said control circuit is a control pulse generator connected to actuate said piezo-electric buzzer intermittently through said pulse generator.

7. A security tag as claimed in claim 6, wherein said operation control circuit further comprises a switch for actuating said switch circuit when said security tag is detached from a product.

8. A sensor as claimed in claim 2, wherein said pulse voltage generating member is longer than said hollow tube.

9. A sensor as claimed in claim 1, wherein said pulse voltage generating member is longer than said hollow tube.

10. A sensor as claimed in claim 3, wherein said pulse voltage generating member is longer than said hollow tube.

11. A sensor as claimed in claim 3, wherein said pulse voltage generating member is a magnetic wire or strip.

12. A sensor as claimed in claim 11, wherein said pulse voltage generating member is longer than said hollow tube.

13. A security tag as claimed in claim 5, wherein said operation control circuit further comprises a switch for actuating said switch circuit when said security tag is detached from a product.

14. A security tag as claimed in claim 13, wherein said pulse voltage generating member of said sensor is longer than said hollow tube.

* * * * *